US010928077B2

(12) United States Patent
Arrus et al.

(10) Patent No.: US 10,928,077 B2
(45) Date of Patent: Feb. 23, 2021

(54) MULTIWAY VALVE WITH BYPASS CIRCUIT

(71) Applicant: GIACOMINI S.P.A., San Maurizio d'Opaglio (IT)

(72) Inventors: Paolo Arrus, San Maurizio d'Opaglio (IT); Samuele Molina, San Maurizio d'Opaglio (IT); Andrea Zuffellato, San Maurizio d'Opaglio (IT); Giacomo Alberganti, San Maurizio d'Opaglio (IT); Marco Rosa Brusin, San Maurizio d'Opaglio (IT)

(73) Assignee: Giacomini S.p.A.

( * ) Notice: Subject to any disclaimer, the term of this patent is extended or adjusted under 35 U.S.C. 154(b) by 4 days.

(21) Appl. No.: 15/564,652

(22) PCT Filed: Apr. 8, 2016

(86) PCT No.: PCT/IB2016/052011
§ 371 (c)(1),
(2) Date: Oct. 5, 2017

(87) PCT Pub. No.: WO2016/162848
PCT Pub. Date: Oct. 13, 2016

(65) Prior Publication Data
US 2018/0080664 A1    Mar. 22, 2018

(30) Foreign Application Priority Data
Apr. 9, 2015   (IT) .......................... MI2015A000504

(51) Int. Cl.
*F24D 19/10*  (2006.01)
*F16K 11/08*  (2006.01)
(Continued)

(52) U.S. Cl.
CPC ...... *F24D 19/1024* (2013.01); *F16K 11/0873* (2013.01); *F16K 27/067* (2013.01); *F24D 12/02* (2013.01); *Y02B 30/00* (2013.01)

(58) Field of Classification Search
CPC ............. F24D 19/1024; F24D 19/1027; F24D 19/103; F24D 19/1033; F16K 11/087;
(Continued)

(56) References Cited

U.S. PATENT DOCUMENTS 4,399,976 A * 8/1983 Legris ................... F16K 5/0642
251/306
7,347,408 B2 * 3/2008 Keiser ................... F16K 5/0605
251/171

(Continued)

FOREIGN PATENT DOCUMENTS

EP    0843116 A2    5/1998
EP    2816239 A1    6/2014
GB    2138110 A    10/1984

OTHER PUBLICATIONS

Original and Translation of EP 0843116 A2; Jung, Kurt and Sellback Jochen; May 20, 1998.*
(Continued)

*Primary Examiner* — Paul J Gray
(74) *Attorney, Agent, or Firm* — Mark Malek; Daniel C. Pierron; Widerman Malek, PL

(57) ABSTRACT

A multiway valve, comprising integrally connected first and second valves. Each valve comprises a valve body comprising a user port, a source port and an intermediate chamber placed therebetween, and a shutter inside the intermediate chamber, having a passage orifice for fluid to pass therethrough. The multiway valve comprises movement means allowing the shutters to move between a closed position where each passage orifice faces the inner walls of the respective intermediate chamber to an open position allow-
(Continued)

ing the passage of the fluid between the user and source ports through the passage orifice. The first valve comprises a bypass duct formed in the shutter opening in fluid communication with the passage orifice. The bypass duct allows fluid communication between the intermediate chamber, the passage orifice, the duct, and the user and source ports of the first valve when the shutter is in its closed position.

10 Claims, 4 Drawing Sheets

(51) Int. Cl.
 *F24D 12/02* (2006.01)
 *F16K 27/06* (2006.01)
 *F16K 11/087* (2006.01)
(58) Field of Classification Search
 CPC ............ F16K 11/0873; F16K 11/0876; F16K 27/003; F16K 27/067; F16K 35/14
 USPC .................. 137/637.1, 637.2, 637.3, 597
 See application file for complete search history.

(56) References Cited

U.S. PATENT DOCUMENTS

| | | | |
|---|---|---|---|
| 2007/0113575 A1 | 5/2007 | Borre et al. | |
| 2011/0041939 A1 | 2/2011 | Tedeschi | |
| 2014/0299806 A1 | 10/2014 | Hoffman | |
| 2015/0027572 A1* | 1/2015 | Morein | F16K 11/0876 137/625.19 |
| 2017/0067665 A1* | 3/2017 | Whitmore | F16K 11/0873 |

OTHER PUBLICATIONS

Lanel, Francois, International Search Report and Written Opinion, PCT/IB2016/052011.
Giacomini S.P.A., Components for a Boiler Room, Six-Way Zone Valve, R274 Series, 0576ML, Aug. 2014.

* cited by examiner

MULTIWAY VALVE WITH BYPASS CIRCUIT

CROSS REFERENCE TO RELATED APPLICATIONS

This is a national state application under 35 U.S.C. § 371 of PCT patent application PCT/IB2016/052011, filed on Apr. 8, 2016, which claims the benefit of IT MI2015A000504, filed on Apr. 9, 2015, each of which is hereby incorporated by reference in its entirety.

TECHNICAL FIELD

The present invention relates to multiway valve field.

In particular the invention relates to a multiway valve equipped with a bypass circuit to control the pressure of a fluid flowing therein according to the preamble of claim 1.

BACKGROUND

Multiway valves are usually employed in systems distributing fluids to regulate their flow between two or more passageways.

In some cases, multiway valves are used to connect a user circuit to several sources or, alternatively, to isolate it from the rest of the system.

This is the case of ceiling systems for heating or cooling domestic or industrial environments. A pair of three-way valves, or as an alternative a six-way valve, are used to connect the user circuit, composed of radiant panels, alternatively to a hot water source (for heating purposes) or to a cold water source (for cooling purposes).

When valves are controlled for isolating the user circuit, the liquid therein has no way out, thus possible changes in the fluid temperature lead to pressure changes that can result in damaging the system or the valves.

In order to overcome such drawbacks, it is known to apply expansion tanks to hydraulic circuits, however such solution is expensive and requires space and it is not always provided in the installation phase.

Six-way valves having a bypass circuit between two of the three passageways have been recently presented, such that should the pressure in the user circuit increase, the fluid can pass from such circuit towards a way out. The bypass circuit is composed of a circular recess, formed on the surface of a shutter of the valve body, peripherally about one of the ports of the passageway of the shutter, such to allow the fluid to pass also with the valve in the closed condition.

Although such valves with bypass are efficacious they have some drawbacks, firstly the fact that the circular recess is near the gaskets and the fluid passing therethrough can cause it to be worn more rapidly. Moreover, although the recess is small, which can be obtained only by technological processes that often are very expansive, it causes a not negligible flow rate to pass therethrough, thus affecting system performance.

OBJECTS AND SUMMARY OF THE INVENTION

It is the object of the present invention to overcome identified drawbacks.

In particular it is the object of the present invention to provide a multiway valve allowing the pressure of a fluid therein to be controlled.

It is a further object of the present invention to provide a multiway valve easy to be manufactured while being efficient.

These and other objects of the present invention are achieved by a multiway valve, embodying the characteristics of the annexed claims, that are an integral part of the present description.

The invention relates to a multiway valve, comprising a first and a second valve integrally connected with each other. Each valve comprises a valve body comprising a user port, a source port and an intermediate chamber placed between the user port and the source port. Each valve further comprises a shutter tightly housed inside the respective intermediate chamber and it has a passage orifice allowing a fluid to pass from the source port to the user port or through the shutter itself. The multiway valve comprises movement means that allow the shutters of the first and second valves to be integrally moved between a closed position where each passage orifice faces the inner walls of the respective intermediate chamber to an open position where the passage of the fluid between the user port and the source port is allowed through the passage orifice.

While the shutter of the second valve is passed through only by the passage orifice, the first valve comprises also a bypass duct formed in the shutter opening on the outer surface of the shutter and that is in fluid communication with the passage orifice. The bypass duct is such that even with the shutter in the closed condition, the intermediate chamber, the passage orifice, the duct, the source port and the user port are in fluid communication.

Such arrangement allows a multiway valve to be provided able to control the operating pressure of a fluid therein, a fluid communication between the user port of the multiway valve and the source port being possible to be established when the user port is for example subjected to overpressures not desired for the proper operation of the valve. In particular when a user circuit is connected between two user ports of the multiway valve and this is in the closed condition, the second valve prevents the fluid from passing from the user circuit to the respective source port. Under such conditions the bypass duct allows possible overpressures in the user port to be released, for example due to the fluid expanding within the user circuit, by flowing the fluid from the user port to the source port through the intermediate chamber.

Further advantageous characteristics are the subject matter of the annexed claims that are an integral part of the present description.

BRIEF DESCRIPTION OF THE DRAWINGS

The invention will be described herein below with reference to not limitative examples, given by way of explanatory and not limiting example in the annexed drawings. These drawings show different aspects and embodiments of the invention and, where appropriate, reference numerals showing similar structures, components, materials and/or elements in different figures are denoted by similar reference numerals.

DETAILED DESCRIPTION OF THE INVENTION

Figure 1:
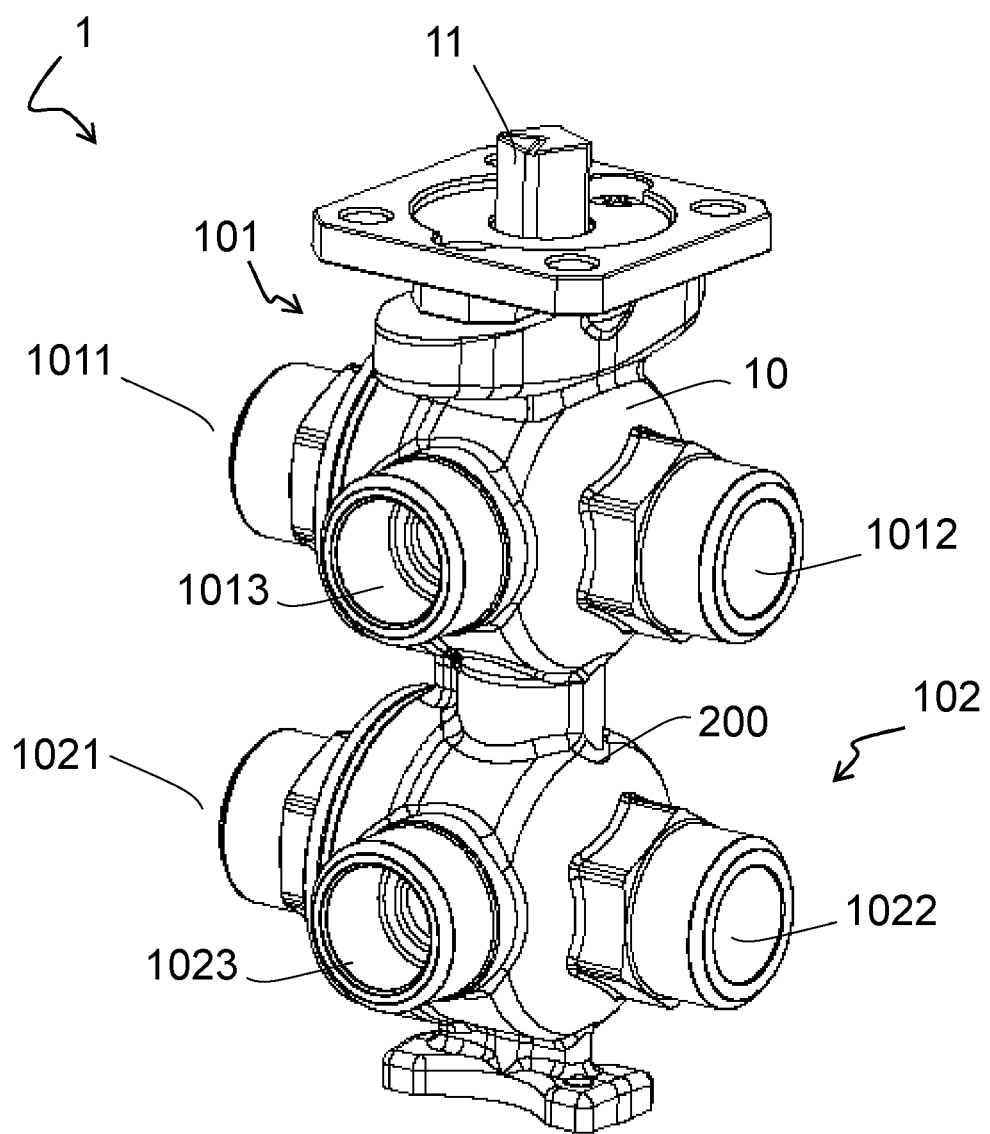
FIG. 1 is a modular six-way valve according to one embodiment of the invention.

While the invention is susceptible of various modifications and alternative constructions, some preferred embodiments are shown in the drawings and will be described in detail herein below.

It should be understood, however, that there is no intention to limit the invention to the specific disclosed embodiment but, on the contrary, the invention intends to cover all the modifications, alternative constructions and equivalents that fall within the scope of the invention as defined in the claims.

The use of "for example", "etc.", "or" denotes non-exclusive alternatives without limitation, unless otherwise indicated.

The use of "includes" means "includes, but not limited to", unless otherwise indicated.

FIG. 1 shows an axonometric projection of a six-way valve 1. The six-way valve 1 is obtained by connecting a first three-way valve 101 and a second three-way valve 102. Therefore the first and second valves 101 and 102 are two modular elements forming the six-way valve 1.

In the example of FIG. 1 the first valve 101 comprises a valve body 10 comprising three ports 1011, 1012 and 1013. Two of such ports (1011, 1012) below are called source ports as, in a typical application of the six-way valve 1, they are intended to receive an operating fluid inside the valve body 10 from two distinct thermal sources, for example one can be connected to a hot water source and the other one to a cold water source. Then the port 1013 is called as user port since it is intended to transmit the operating fluid received from one of the two sources, typically water, to a user circuit.

The valve body 10 generally is made as a single piece but it can be also composed of several parts screwed together or flanged with each other or connected in other manner.

Figure 2:
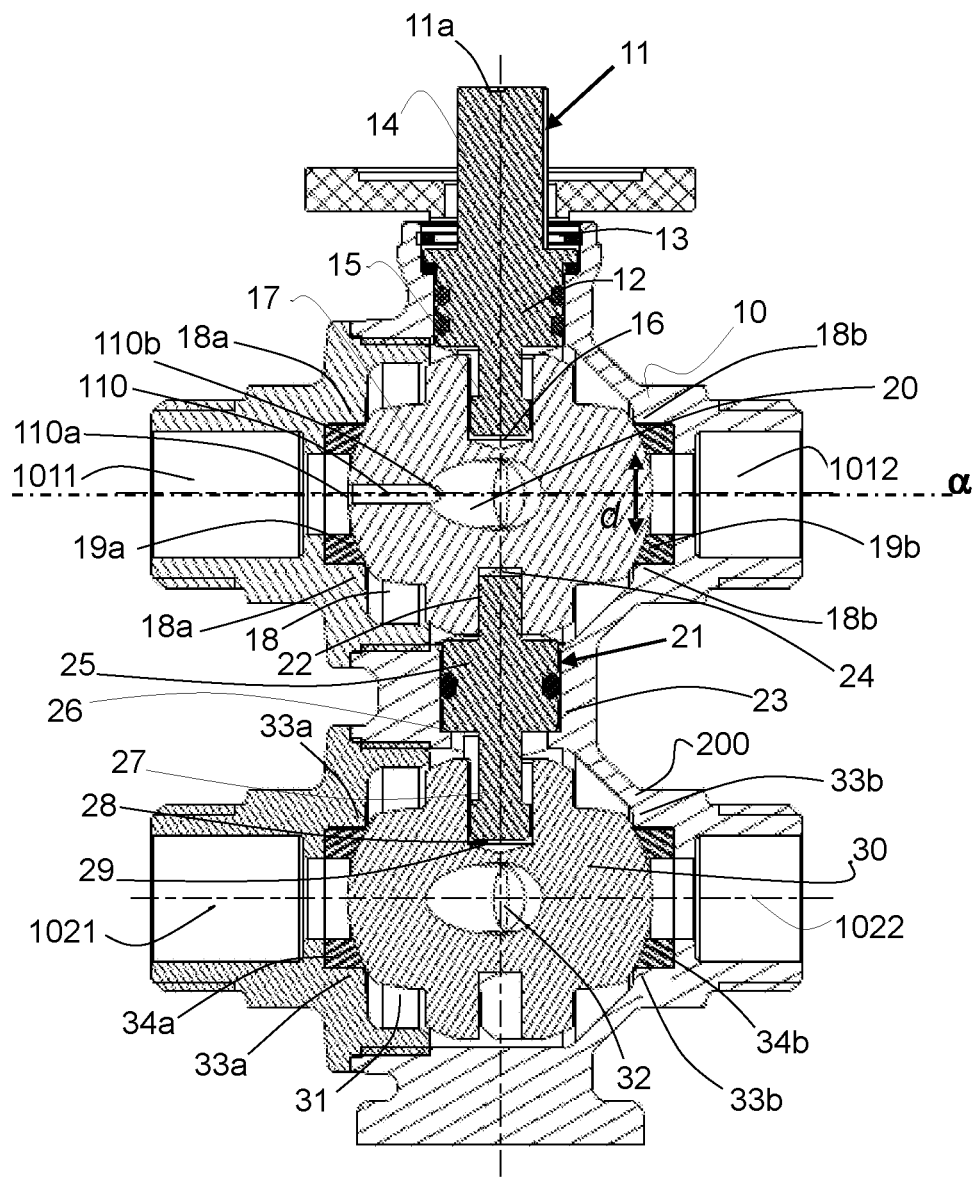
FIG. 2 is a view taken along a vertical section of the valve of FIG. 1.

The first valve 101 is provided with movement means that in the example of FIG. 1 comprise a stem 11. The stem 11, as better seen in the example of FIG. 2, has a profile comprising an enlarged intermediate section 12 abutting 13 on the valve body 10, and an elongated body 14 with two ends. The elongated body, as shown in the figure, is shaped like a right rectangular prism, but it can be made with other profiles, for example a triangular one. Moreover the elongated body 14 of the stem 11 develops along an axis orthogonal to the axis on which the geometric centers of the two source ports 1011 and 1012 lie.

The elongated body 14 penetrates and is fitted by an inner end 15 into a seat 16 of a ball shutter 17, along a diametral axis thereof. The shutter 17 is housed into an intermediate chamber 18 obtained inside the valve body 10. A rotation of the stem 11 causes the shutter 17 to correspondingly rotate inside the intermediate chamber 18.

The shutter is preferably made of the same material as the valve body and it has a very fine surface finishing to allow having a good contact with respective sealing seats (18a, 18b) obtained on inner faces opposite to the intermediate chamber 18, at the source ports 1011 and 1012.

Moreover the shutter 17 is in contact with the sealing seats through the interposition of shaped sealing rings, particularly gaskets (19a, 19b) having an inner diameter d smaller than that of the two first source ports (1011, 1012).

The sealing rings 19a and 19b prevent the fluid from escaping through the source ports (1011, 1012) to the inside of the intermediate chamber 18.

Inside the shutter 17 a passage orifice 20 is obtained symmetrically developing along a diametral plane α of the shutter and orthogonal to the development plane of the elongated body 14 of the stem 11.

Figure 4:
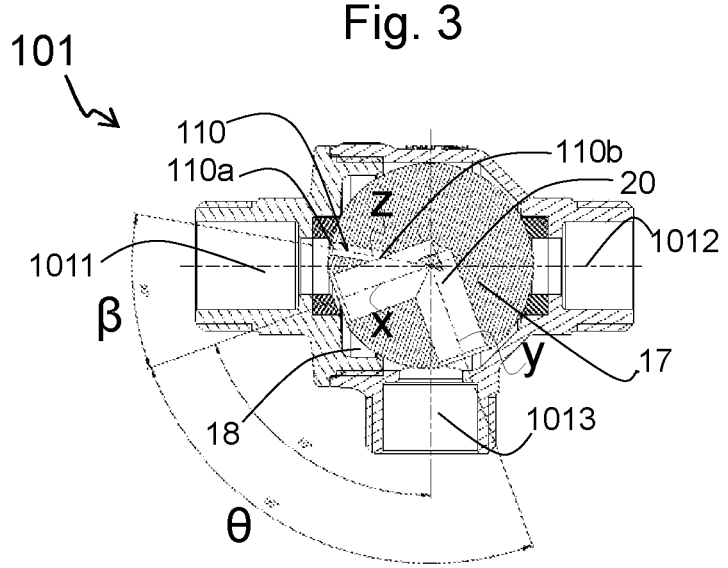
FIGS. 4, 5, 6 and 7 are a view taken along a section on a transverse plane of the valve of FIG. 1 in different operating positions.

The passage orifice 20, well visible in FIG. 4, is a circular section elbow duct, i.e. bent at 90° at the center of the shutter. Such duct therefore is composed of two cylindrical portions developing on orthogonal axes (x and y) crossing with each other at the center of the shutter.

The rotation of the stem 11, for example by a manual operation or by a pneumatic shutter (not shown in the figures) fitted on one free end thereof 11a, causes the shutter 17 to rotate inside the intermediate chamber 18, and then causes the passage orifice 20 to rotate that selectively puts the user port in communication with one of the two source ports, thus regulating the passage of the fluid inside the valve body 10.

For example with reference to FIG. 1, the rotation of the stem in a position corresponding to an angle of 0°, allows the port 1011 and the port 1013 to be in fluid communication, since such position of the stem 11 rotates the passage orifice 20 of the first shutter such to allow the fluid to pass through the first valve 101 from the port 1011 to the port 1013. On the contrary the rotation of the stem in a position corresponding to an angle of 90° allows the fluid to pass in the orifice, between the port 1012 and the port 1013.

When on the contrary the stem 11 is rotated by 45°, the passage orifice 20 faces the inner walls of the chamber 18 and the shutter 17 obstructs the fluid flow coming from both the source ports (1011, 1012) such as better shown below with reference to FIG. 6, for example preventing the fluid from passing from the source port 1012 to the user port 1013.

The first valve 101 is the primary valve of the six-way valve 1, that is the valve on which the control of the multiway valve 1 will be exerted. The second valve 102 is the secondary valve, since its opening or closure depends on the action exerted on the stem 11 of the first valve 101.

The physical and functional connection between the two valves 101, 102 occurs by connecting the shutter 17 of the first valve 101 to movement means (in the example of FIG. 2 they being a stem 21) of the shutter 30 of the second valve 102.

The first valve 101 and second valve 102 each comprise a valve body 200 comprising three ports 1021, 1022 and 1023. Two of such ports are called as source ports (1021, 1022) since, in the typical application, are intended to be connected to the return circuit of the two sources whose delivery is connected to the first valve 101. The port 1023 on the contrary is a user port since it is designed for being connected to the user circuit likewise port 1013.

The shutter 17 of the first valve 101 provides a seat 22, diametrically opposite to the seat 16, where an upper end 24 of the stem 21 of the second valve 102 is fitted. At such seat 22, the valve body 10 of the first valve 101, has a neck 23 intended to be connected to the valve body 200 of the second valve 102.

Akin to first valve 101, the stem 21 of the second valve 102 has a profile comprising an enlarged intermediate section 25, abutting 26 on the valve body 200, and an elongated body 27. The elongated body penetrates and is fitted by an inner end 28 into a seat 29 of the shutter 30, along a diametral axis thereof. The shutter 30 is tightly housed in an intermediate chamber 31 obtained inside the valve body 200, and inside it has a passage orifice 32 with the same geometry and oriented as the passage orifice 20 of the first valve 101.

Figure 3:
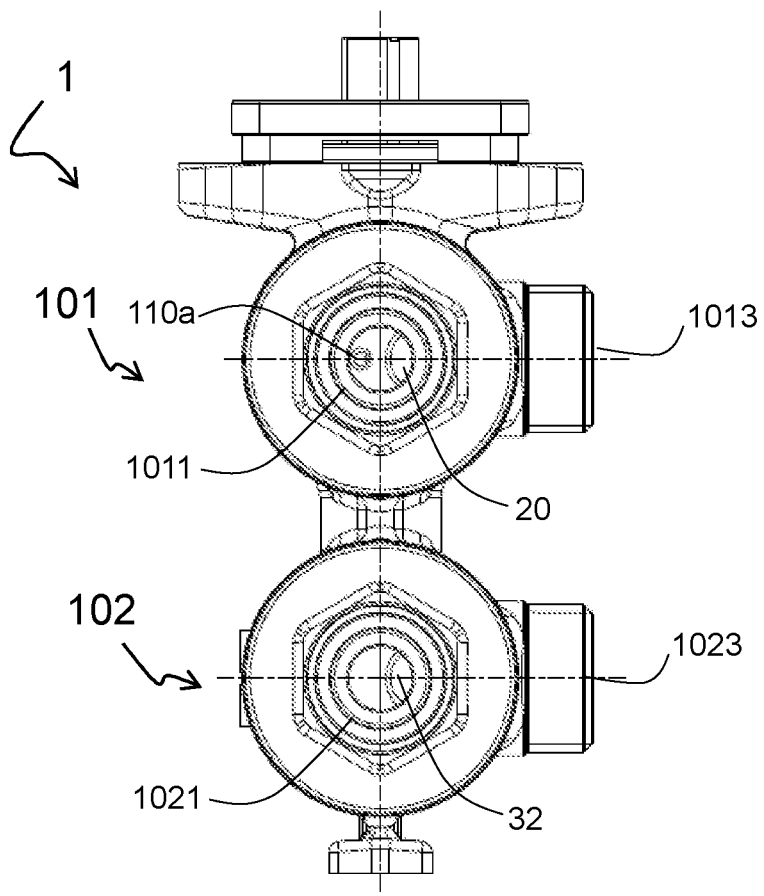
FIG. 3 is a side view of the valve of FIG. 1.

Moreover as described for the first valve 101, the shutter 30 of the second valve 102 is in contact with respective sealing seats (33a, 33b) obtained on inner faces opposite to the intermediate chamber 31. In particular as seen in examples of FIGS. 2 and 3, the shutter 30 is in contact with the sealing seats through the interposition of respective shaped rings 34a and 34b.

Due to the above connections, a rotation of the shutter 17 corresponds to the same rotation of the shutter 30 and consequently a similar regulation of the fluid passage between one of the source ports 1021 and 1022 and the user port 1023 through the passage orifice 32.

Unlike the second valve 102, in the shutter 17 of the first valve 101 a by-pass circuit is obtained, that under specific conditions, acts for the fluid communication between the intermediate chamber 18 and the source port 1011.

With reference to FIG. 4 the by-pass circuit comprises a cylindrical duct 110 developing along a radial direction in the shutter 17 lying on the diametral plane α. The inner diameter of the duct 110 is preferably greater or equal to 3 mm, throughout its length.

The shape and/or position of the duct 110 can be different. For example, the duct 110 can have at least a position with an axis not belonging to plane α, provided that when the shutter is in the closed position, shown in FIG. 6, the duct is shaped such to open on the port 1011.

In the example of FIG. 4, the by-pass duct 110 is oriented in such a manner to form an angle β of 30° consecutive to the right angle θ formed of the curvature of the passage orifice 20. The consecutive angles β and θ are shown in FIG. 4, their vertix is at the center of the shutter 17 and are delimited by the axes of the by-pass duct 110 (z axis) and by the arms of the passage orifice 20 (x and y axes).

The by-pass duct 110 further comprises an outer port 110a opening on the surface of the shutter 17 and an inner port 110b facing the passage orifice 20, such that the inner port puts the passage orifice 20 and the duct 110 in fluid communication.

Figure 5:
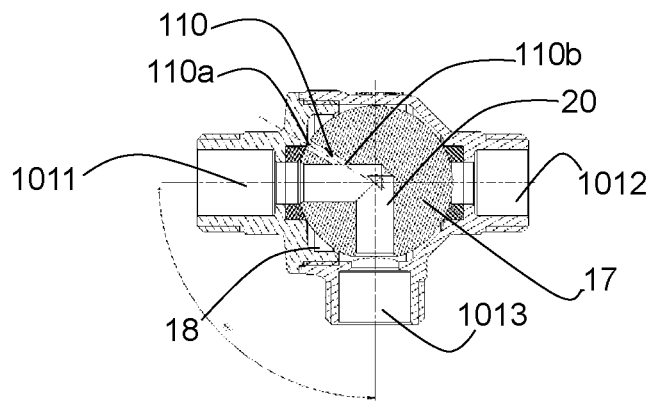
Figure 6:
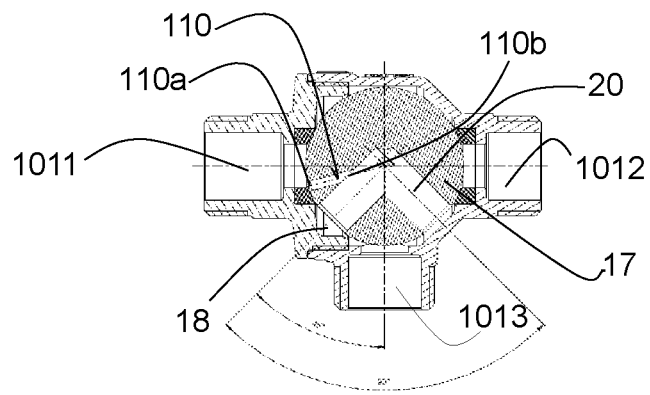

Such as shown in FIG. 6, when the shutter 17 is rotated by ±45° with respect to a position (shown in FIGS. 5 and 7) opening the valve, the by-pass duct 110 is oriented such to allow the outer port 110a to be faced at the source port 1011 and therefore to allow the fluid in the intermediate chamber 18 to flow therein when subjected to undesired overpressures.

When the stem 11 is rotated by 45°, the shutter 17 is in the closed position (FIG. 6) that is oriented with the passage orifice 20 facing the inner walls of the chamber 18. Likewise the shutter 30, due to what said above, is in the same position and it has the passage orifice 32 oriented such to face the inner walls of the intermediate chamber 31. In this condition, the fluid present in a possible user circuit connected between the user ports 1013 and 1023 cannot escape from the source ports 1021 and 1022 (closed by the shutter 30) and it cannot enter from the source port 1012 (closed by the shutter 17). Possible temperature rises can expand the fluid in the user circuit, thus flowing in the intermediate chamber 18 through the user port 1013.

Since, as visible in FIGS. 4-7, in the first valve 101 the sealing rings 19a and 19b are provided only at the source ports, the fluid coming from the port 1013 flooding the intermediate chamber 18, fills the passage orifice 20 and it flows, through the duct 110 from the inner port 110b to the outer port 110a, in the source port 1011.

Figure 7:
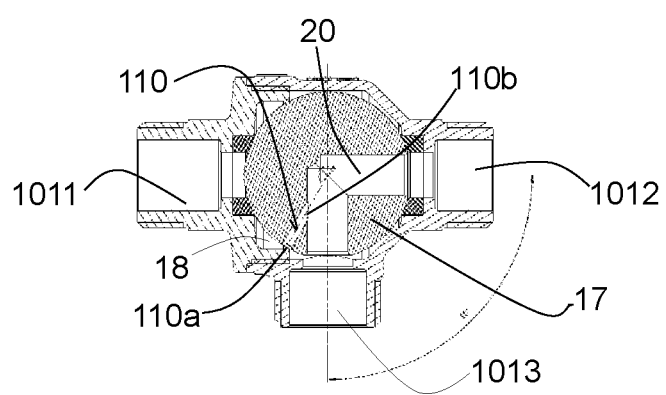

Vice versa, with reference to FIG. 5 and FIG. 7, the rotation of the stem corresponding to a position of 0° and 90° respectively, causes the outer port 110a of the duct 110 to simply face the intermediate chamber 18 and it does not take part in the fluid communication enabled by the passage orifice 20, in the first case between the port 1011 and the port 1013, and in the second case between the port 1012 and the port 1013.

In view of the above description, it is clear how the invention allows the above suggested objects to be achieved by using a by-pass circuit inside a valve.

Therefore it is clear that the person skilled in the art can make different changes to the above examples, without for this reason departing from the scope of protection of the present invention, as defined in the annexed claims.

For example, although the description is about a six-way valve, composed of two modular three-way valve elements, the invention is not limited to the number of ways or to the fact that the valve is a modular valve.

Therefore the invention generally relates to a valve with a valve body comprising a first and a second port, and an intermediate chamber interposed between the two ports. A shutter, tightly housed in the intermediate chamber, comprising a passage orifice for the fluid, is operated by movement means accessible from the outside of the valve body, such to allow or prevent the fluid from passing between the two ports. The valve then comprises a by-pass circuit obtained in the shutter to put the intermediate chamber in fluid communication with one of the two ports. The by-pass circuit comprises a duct in fluid communication with the passage orifice, such that with the shutter in the closed position, the intermediate chamber, the passage orifice, the duct and one of the two ports are in fluid communication.

The above being said, it is preferred for the valve to have at least three ways.

The invention claimed is:

1. A multiway valve, comprising:
a first valve and a second valve integrally connected with each other, each of the first and second valves comprising:
a valve body comprising:
a user output port,
a first source port,
a second source port;
an intermediate chamber arranged between the user port and the first source port; and
a shutter housed inside the intermediate chamber and comprising a passage orifice passing through the shutter;
said intermediate chamber being limited by an internal wall of the valve body and an outer surface of the shutter; and
a member configured to transition the shutter of each of the first valve and the second valve between a closed position where the passage orifice of each shutter faces the inner walls of the respective intermediate chamber and, selectively, first open position where the flow of fluid between the first source port and the user output port is allowed through the passage orifice and a second open position where the flow of fluid between the second source port and the user output port is allowed through the passage orifice, in said closed position the second source port is not in fluid communication with either of the user output port and the first source port;
wherein the valve body of the first valve comprises two sealing seats obtained on inner faces of the intermediate chamber arranged at the first and second source ports of said first valve and wherein the shutter is in contact with the sealing seats by the interposition of sealing rings, such to prevent the fluid from escaping between the first and second source ports and the inside of the intermediate chamber, said intermediate chamber being floodable by fluid coming from the user output port in said closed position due to over-pressure;

and wherein the first valve has a single by-pass duct formed in the shutter, the single by-pass duct being open at one end on the outer surface of the shutter and at an opposite end to the passage orifice without completely passing through said shutter of the first valve, said bypass duct being such that, in the closed position, the intermediate chamber, the passage orifice, the duct, the first source port and the user output port of the first valve are in fluid communication; the first valve being configured to allow, in the closed position, the fluid coming from the user output port in presence of over-pressures floods the intermediate chamber, fills the passage orifice and flows through said by-pass duct, in said first source port.

2. A multiway valve according to claim 1, wherein the bypass duct is a radial duct, with an inner diameter greater than or equal to 3 mm throughout its length.

3. A multiway valve according to claim 1, wherein the passage orifice is an elbow duct comprising two portions developing along orthogonal axes (x, y) crossing at the center of the shutter and wherein the bypass duct radially develops in the shutter and it is oriented along a z-axis forming an angle of 30° consecutive to a further angle formed by axes of said two portions.

4. A multiway valve according to claim 1, wherein the shutter of the first valve is a ball shutter which is passed through only by said passage orifice and by said bypass duct, wherein said passage orifice is a duct opening on two ports obtained on the surface of the shutter, and wherein said bypass duct is a radial duct comprising an outer port on the surface of the shutter and an inner port facing the passage orifice, and wherein the shutter of the second valve is a ball shutter passed through only by the respective passage orifice.

5. A multiway valve according to claim 1, wherein the shutter is a ball shutter in contact with sealing seats of the valve body through O-rings.

6. A multiway valve according to claim 1, wherein said sealing rings are gaskets having an inner diameter smaller than that of the first and second source ports of the first valve, such to prevent the fluid from escaping between the first and second source ports and the inside of the intermediate chamber.

7. A multiway valve according to claim 1, wherein said member comprise:

a first stem comprising a profile comprising a first enlarged intermediate section abutting on the valve body of the shutter of the first valve, and a first elongated body developing along an axis orthogonal to the axis on which the geometric center of the first source port lies and that penetrates and is fitted by an inner end of a seat of the shutter of the first valve, along a diametral axis thereof, a second stem having a profile comprising a second enlarged intermediate section abutting on the second valve body and a second elongated body, the second elongated body has an upper end fitting into a second seat of the shutter of the first valve diametrically opposite to the seat housing the stem, the second elongated body penetrates and is fitted by an inner end of a third seat of the shutter of the second valve along a diametral axis thereof.

8. A multiway valve according to claim 1, wherein the passage orifice of the first valve has a geometric configuration; and wherein the passage orifice of the second valve has a geometric configuration conforming to the geometric configuration of the first valve; wherein the passage orifice of the first valve has an orientation; and wherein the passage orifice of the second valve has an orientation conforming to the orientation of the passage orifice of the first valve.

9. A multiway valve according to claim 1, wherein the first and second valves are three-way valves, and wherein the passage orifice of the first and second valve are circular section elbow ducts.

10. A multiway valve according to claim 1, wherein the first and second valves are two modular elements composing a modular valve.

* * * * *